May 13, 1930.  S. SUNDERLAND  1,758,067

MACHINE FOR CUTTING OR GENERATING THE TEETH OF WHEELS

Filed Nov. 29, 1927

INVENTOR:
Sam Sunderland
by [signature]
attys.

Patented May 13, 1930

1,758,067

UNITED STATES PATENT OFFICE

SAM SUNDERLAND, OF KEIGHLEY, ENGLAND

MACHINE FOR CUTTING OR GENERATING THE TEETH OF WHEELS

Application filed November 29, 1927, Serial No. 236,458, and in Great Britain December 28, 1926.

This invention relates to the type or class of machines for cutting or generating the teeth of wheels in which the blank which is being cut revolves continuously about its axis during the time that the reciprocating cutter effects the cutting operations by moving over the blank, the feed for the cutting of the teeth being carried out by the cutter being moved tangentially over said blank in such manner that when the teeth of the cutter have moved sufficiently far over the tangent that one complete tooth has been cut said cutter is then reversed in its advancing movement and brought back to recommence its cutting operations to produce the next tooth while as is stated the blank is continuously revolving in manner well known.

In this type of machine it is usual to feed the cutter in the tangential direction described by the employment of a worm or screw which is actuated automatically through change speed gearing in order that the space which it moves through over the tangent of the blank is kept equal to the circumferential motion of said blank which is moving simultaneously therewith and by the cutter thus being fed tangentially thereto (commencing below the axis of the blank and travelling over the tangent of said blank) the tooth is generated by the advancing of said cutter through a space equal to the pitch of one tooth from the other and after completing said cutting actions the cutter is again readjusted in its commencing position to be again caused to advance tangentially over the periphery of the blank as is well known.

I have found under certain conditions and to produce teeth of the desired shape and with the greatest accuracy as to dimensions, the actions of the change speed gearing and the worm or screw which operates the carriage to feed the cutters as described, are not so accurate as is sometimes desired. To obviate this defect by the employment of means which will effect the cutting or generating of the teeth of wheels with the greatest accuracy and regularity is the object of my present invention, and to attain this object I make use of sliding inclines instead of the screws for effecting the tangential generating movements of the cutter as above explained. These inclines I proportion and arrange to be operated so that the gradual advancing movement of the cutter is carried out without any reverse movement of the blank but with a reverse movement of the cutter when each single tooth has been cut until the whole series of teeth are separately generated.

In order that my said invention may be readily understood, I have hereunto appended a sheet of drawings illustrative thereof, to which by figures and letters, reference is made in the following description:—

Figs. 3 and 4 show one of the members of my improved devices in detail.

Figure 1:
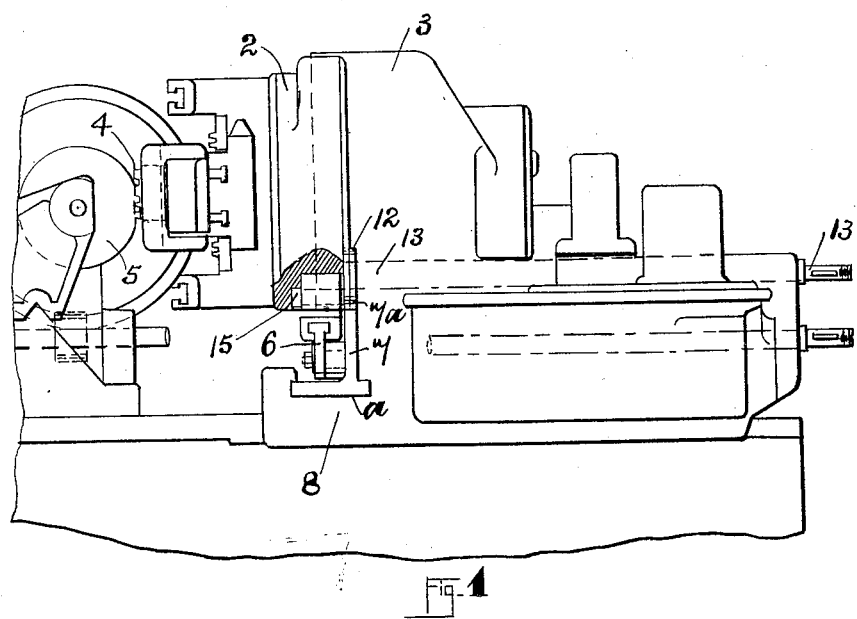
Fig. 1 is a side elevation partly in section showing the type of machine to which my invention relates with my improved parts applied thereto.

In this type of machine as is well known the usual vertical screw which effects the rising and falling movements of the sliding bearings 2 over the framework 3 in order to feed the cutters 4 tangentially to the blank 5 which is being cut, is usually operated by bevel gears deriving their motion from a horizontal shaft 13 in the machine at the outer end of which change speed gearing is mounted in order that the amount of motion transmitted vertically to the cutters 4 may be adjusted or regulated according to said alterations of the speed gearing.

Instead of using the screw or worm described and the bevel gearing which operates same I now make use of a sliding incline 6 which I secure to a sliding block 7 the lower surface $a$ of which is perfectly straight and even and is arranged to slide over an appropriate prepared bed plate or base piece 8 so that in its sliding actions the inclined surface $b$ of the member 6 will raise the sliding member 2 of the machine, and therefore the cutters 4, the desired space during the cutting operations.

This inclined surface $b$ I form of a considerable length so that it has to travel through a considerable space over its base 8 to transmit comparatively little motion to the sliding member 2. As for example I may have the inclined surface $b$ say twelve inches long and this I arrange to move through the full twelve inches of space while the inclination of its surface $b$ might only transmit one inch of vertical motion to the sliding bearings 2 and therefore to the cutters 4 when said one inch equals the pitch of the teeth that are being cut. That is to say, when the pitch of the teeth is one inch then the motion transmitted to the slide 2 would be vertically through one inch of space while the inclined surface $b$ to accomplish this would have moved the full twelve inches by which arrangement greater accuracy is secured in the feeding of the cutters 4 to the blank 5 inasmuch as by having an incline $b$ considerably greater than the space through which the cutter 4 is desired to be carried irregularities are reduced to a minimum.

According to one arrangement instead of having the usual change speed gearing wheels I preferably keep said wheels of given proportions to carry out the horizontal motions of the incline $b$ and instead of altering the said change speed wheels to carry said incline $b$ through any less space than its full movement to perform the feeding actions to a less degree, I prefer to make use of separate inclined pieces 6 for each pitch of teeth that has to be cut and I keep the travelling of said incline $b$ constant while the inclination of said surface $b$ will vary according to the greater or less pitch of teeth that has to be generated.

In cases where the great accuracy hereinbefore referred to is not required, it is obvious that instead of moving the inclined piece $b$ through the whole of its path when cutting gearing of a rougher or less accurate kind, I may make use of change speed gearing for carrying out the movement of the incline $b$ through a less or greater space as desired. Or again I may mount the inclined member 6 upon a sliding member 7 so that its inclined surface $b$ may be adjusted by causing the member 6 to pivotally move upon a stud 9 which is fixed to the sliding member 7, while the quadrant slot $6^a$ enables me to secure the inclined member 6 by a bolt $6^b$ in any raised position in which I may have adjusted same.

Figure 2:
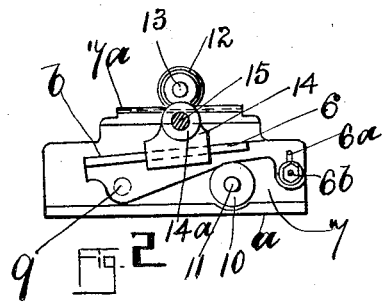
Fig. 2 is an elevation of certain of the parts shown by Fig. 1 as seen looking from right to left of said figure.
Figure 5:
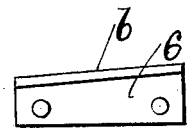
Figs. 5 and 6 illustrate another member of my improved devices hereinafter explained.
Figure 6:
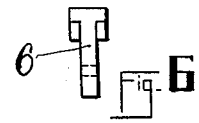
Figure 4:
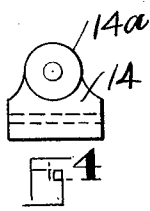

To secure an absolutely solid adjustment of this adjustable member 6 in its proper position, I mount a detachable bush 10 upon a pin or stud 11 which is fixed to or formed integrally with the sliding member 7 thus the lower edge of the member 6 as shown at Fig. 2 engaging a different bush 10 will support said member 6 in a higher or lower position where it may be further secured by the bolt $6^b$ as above described, by which means the varied pitches of teeth may be regulated with the greatest accuracy without altering any of the change speed gearing as heretofore explained.

The sliding member 7 upon which the incline piece 6 is fixed has rack teeth $7^a$ formed upon its upper edge and these are arranged to gear with a pinion 12 which is fixed upon the shaft 13 so that motion is transmitted at the desired speed through the desired space by said shaft 13 through the pinion 12 to the rack $7^a$ and therefore to the sliding member 7 and its incline 6.

Arranged to span and slide upon the incline 6 is an engaging bracket 14 which is caused to rise and fall as the incline $b$ is forced forward and backward through same as will be understood, and this sliding bracket 14 is fixed by a pin 15 taking through its hub part $14^a$ so as to enter and take within the sliding member 2 by which arrangement the rising and falling movements of the bracket 14 produced or effected by the actions of the incline 6 are transmitted to the slide 2 and therefore to the cutter 4.

When it is found that wheels having teeth of what are known as "bastard pitches" such for example as a pitch that is .723" I may use an incline which will give me the .75" movement when moved through its full length and in connection with such incline I then have the change wheels upon the shaft 13 to reduce that movement so as to give .723" of a rise and these variations may be made as required for the varied pitches desired.

Such being the nature and object of my said invention what I claim is:—

1. In a cutter machine of the class described, a movable cutter support, a member extending transversely of the machine, an arm pivoted to said member and having an inclined upper surface, a bracket slidably engaging said inclined surface and connected to said support, whereby upon the actuation of said member a reciprocating movement is imparted to said cutter support, and means for moving said member transversely of the machine.

2. In a cutter machine of the class described, a movable cutter support, a member extending transversely of the machine, an arm pivoted to said member and having an inclined upper surface, a bracket slidably engaging said inclined surface and connected to said support, means for varying the inclination of said arm and maintaining the same in a predetermined fixed position, whereby upon the actuation of said member, a reciprocating movement is imparted to said cutter support, and means for moving said member transversely of the machine.

SAM SUNDERLAND.